(12) United States Patent
Zhang et al.

(10) Patent No.: US 9,475,711 B2
(45) Date of Patent: Oct. 25, 2016

(54) DESALINATION SYSTEM AND METHOD

(71) Applicant: General Electric Company, Schenectady, NY (US)

(72) Inventors: Chengqian Zhang, Shanghai (CN); Hai Yang, Shanghai (CN); Rihua Xiong, Shanghai (CN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 69 days.

(21) Appl. No.: 14/384,721

(22) PCT Filed: Feb. 14, 2013

(86) PCT No.: PCT/US2013/026071
§ 371 (c)(1),
(2) Date: Sep. 12, 2014

(87) PCT Pub. No.: WO2013/138012
PCT Pub. Date: Sep. 19, 2013

(65) Prior Publication Data
US 2015/0041322 A1 Feb. 12, 2015

(30) Foreign Application Priority Data

Mar. 12, 2012 (CN) .......................... 2012 1 0063881

(51) Int. Cl.
*B01D 61/44* (2006.01)
*C02F 1/469* (2006.01)
(Continued)

(52) U.S. Cl.
CPC ............ *C02F 1/4695* (2013.01); *B01D 61/46* (2013.01); *B01D 61/52* (2013.01); *B01D 61/58* (2013.01);
(Continued)

(58) Field of Classification Search
CPC ............................... B01D 61/44; B01D 61/46
See application file for complete search history.

(56) References Cited

U.S. PATENT DOCUMENTS 4,110,175 A     8/1978 Ahlgren et al.
4,227,981 A * 10/1980 Williams ............... B01D 61/44
                                                                                                         204/527

(Continued)

FOREIGN PATENT DOCUMENTS

AU       514772 B2    2/1981
CN       1769193 A    5/2006

(Continued)

OTHER PUBLICATIONS

International Search Report and Written Opinion issued in connection with corresponding PCT application PCT/US2013/026071 on Jun. 21, 2013.

(Continued)

Primary Examiner — Arun S Phasge
(74) *Attorney, Agent, or Firm* — GE Global Patent Operation

(57) ABSTRACT

A desalination system comprises a silica removal unit. The silica removal unit comprises first and second electrodes, a plurality of ion exchange membranes disposed between the first and second electrodes and a plurality of spacers disposed between adjacent ion exchange membranes and between the first and second electrodes and the respective ion exchange membranes. The plurality of the ion exchange membranes comprises a pair of cation exchange membranes and a pair of anion exchange membranes disposed between the pair of cation exchange membranes. A first channel is defined between the anion exchange membranes and second and third channels are defined between each anion exchange membrane and an adjacent cation exchange membrane. A silica removal apparatus and a desalination method are also presented.

19 Claims, 5 Drawing Sheets

(51) Int. Cl.

| | | |
|---|---|---|
| *B01D 61/46* | (2006.01) | |
| *B01D 61/52* | (2006.01) | |
| *B01D 61/58* | (2006.01) | |
| *C02F 1/60* | (2006.01) | |
| *B01D 65/08* | (2006.01) | |
| *C02F 1/46* | (2006.01) | |
| *C02F 1/52* | (2006.01) | |
| *C02F 1/66* | (2006.01) | |
| *C02F 1/461* | (2006.01) | |
| *C02F 103/08* | (2006.01) | |
| *C02F 101/10* | (2006.01) | |

(52) U.S. Cl.
CPC ............ *B01D 65/08* (2013.01); *C02F 1/4693* (2013.01); *C02F 1/60* (2013.01); *B01D 2311/18* (2013.01); *B01D 2313/14* (2013.01); *B01D 2321/223* (2013.01); *C02F 1/4602* (2013.01); *C02F 1/4691* (2013.01); *C02F 1/52* (2013.01); *C02F 1/66* (2013.01); *C02F 2001/46171* (2013.01); *C02F 2101/10* (2013.01); *C02F 2103/08* (2013.01); *C02F 2201/003* (2013.01); *C02F 2201/46* (2013.01); *C02F 2201/4613* (2013.01); *C02F 2303/22* (2013.01)

(56) References Cited

U.S. PATENT DOCUMENTS

| | | | |
|---|---|---|---|
| 4,298,442 A * | 11/1981 | Giuffrida | ............... B01D 61/44 204/517 |
| 6,730,227 B2 | 5/2004 | Zeiher et al. | |
| 7,338,600 B2 | 3/2008 | Chidambaran et al. | |
| 7,514,001 B2 | 4/2009 | Costa et al. | |
| 7,591,933 B2 | 9/2009 | Grebenyuk et al. | |
| 7,662,267 B2 | 2/2010 | Carson et al. | |
| 2010/0247415 A1 | 9/2010 | Gottlieb et al. | |

FOREIGN PATENT DOCUMENTS

| | | |
|---|---|---|
| CN | 201037122 Y | 3/2008 |
| GB | 1005125 A | 9/1965 |
| JP | 2001327971 A | 11/2001 |
| JP | 2007167745 A | 7/2007 |
| TW | 200838807 A | 10/2008 |
| WO | 2011152226 A1 | 12/2011 |

OTHER PUBLICATIONS

Voss H: "Deacidification of Citric Acid Solutions by Electrodialysis", Journal of Membrane Science, vol. 27, Jun. 1, 1986, pp. 165-171.

Dydo et al., "The Concept of Boron Removal and Concentration in an Integrated Membrane System", Proceedings of the First International Conference on Methods and Materials for Separation Processes, pp. 151, Jun. 5-9, 2011.

Arthur et al., "Technical Summary of Oil & Gas Produced Water Treatment Technologies", All Consulting, LLC, pp. 1-53, Mar. 2005.

Dey, "Performance of Cross-flow Spiral-Wound EDI Modules", WaterTech Online.com, Oct. 2005.

European Office Action issued in connection with corresponding EP Application No. 13706863.1 on Oct. 2, 2015.

Unofficial English Translation of Chinese Office Action issued in connection with corresponding CN Application No. 201210063881.2 on Jan. 30, 2014.

\* cited by examiner

DESALINATION SYSTEM AND METHOD

BACKGROUND OF THE DISCLOSURE

The invention relates generally to desalination systems and methods for water recovery. More particularly, this invention relates to desalination systems and methods using ion exchange membranes for silica removal and water recovery.

In industrial processes, large amounts of wastewater, such as aqueous saline solutions are produced. Generally, such wastewater is not suitable for direct consumption in domestic or industrial applications. In view of the limited eligible water sources, it is desirable to recover eligible water from the wastewater.

There have been attempts to remove silica from the wastewater or other water sources containing silica. For example, streams containing silica are introduced into desalination apparatuses, such as reverse osmosis apparatuses while pH of such streams is increased for silica removal because higher pH of the streams results in higher ionization of silica. However, such processes suffer from complicated and rigorous pretreatment requirements and high cost. Typically, fluctuation and inefficiency of the pretreatment may cause scaling or fouling of sparingly soluble salts, such as magnesium hydroxide or calcium carbonate within the silica removal apparatuses, which is disadvantageous for silica removal and the silica removal apparatuses.

Therefore, there is a need for new and improved desalination systems and methods for silica removal and water recovery.

BRIEF DESCRIPTION OF THE DISCLOSURE

A desalination system is provided in accordance with one embodiment of the invention. The desalination system comprises a silica removal unit configured to receive a first feed stream for silica removal. The silica removal unit comprises first and second electrodes, a plurality of ion exchange membranes disposed between the first and second electrodes and a plurality of spacers disposed between adjacent ion exchange membranes and between the first and second electrodes and the respective ion exchange membranes. The plurality of ion exchange membranes comprises a pair of cation exchange membranes and a pair of anion exchange membranes disposed between the pair of cation exchange membranes. A first channel is defined between the anion exchange membranes and second and third channels are defined between each anion exchange membrane and an adjacent cation exchange membrane.

A desalination system is provided in accordance with another embodiment of the invention. The desalination system comprises a silica removal apparatus configured to receive a first feed stream for silica removal. The silica removal apparatus comprises first and second electrodes, a plurality of ion exchange membranes disposed between the first and second electrodes, and a plurality of spacers disposed between adjacent ion exchange membranes and between the first and second electrodes and the respective ion exchange membranes. The plurality of the ion exchange membranes comprises at least three cation exchange membranes and at least two pairs of anion exchange membranes. Each pair of anion exchange membranes is disposed between two cation exchange membranes so as to define a first channel between each pair of anion exchange membranes and second and third channels between each anion exchange membranes of each pair and an adjacent cation exchange membrane.

Embodiment of the invention further provides a desalination method for removing silica from an aqueous stream. The desalination method comprises passing a first feed stream through a first channel defined between at least one pair of anion exchange membranes disposed between first and second electrodes of a silica removal apparatus to produce a first output stream for silica removal; passing a second feed stream through a second channel defined between the anion exchange membrane of the at least one pair of anion exchange membranes and an adjacent cation exchange membrane disposed between the at least one pair of anion exchange membranes and the first electrode to carry away silica removed from the first feed stream and to produce a second output stream; and passing a third feed stream through a third channel defined between the anion exchange membrane of the at least one pair of anion exchange membranes and an adjacent cation exchange membrane disposed between the at least one pair of anion exchange membranes and the second electrode to facilitate silica removal from the first channel to the adjacent second channel and to produce a third output stream.

These and other advantages and features will be better understood from the following detailed description of preferred embodiments of the invention that is provided in connection with the accompanying drawings.

DETAILED DESCRIPTION OF THE INVENTION

Preferred embodiments of the present disclosure will be described hereinbelow with reference to the accompanying drawings. In the following description, well-known functions or constructions are not described in detail to avoid obscuring the disclosure in unnecessary detail.

Figure 1:
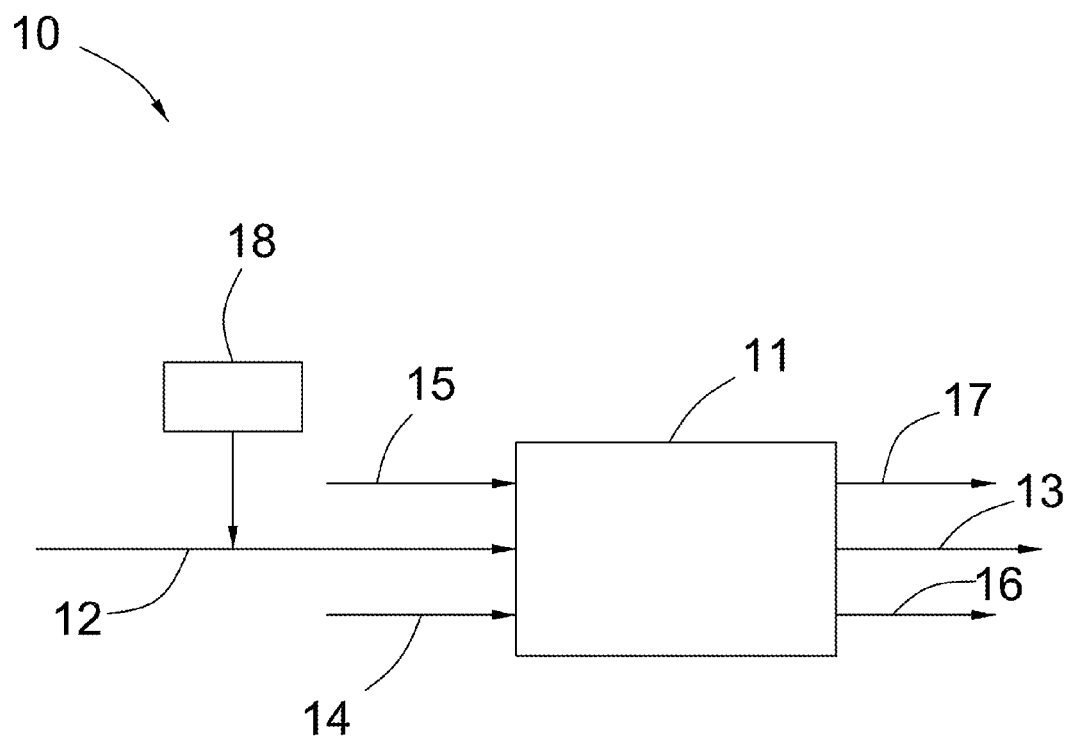
FIG. 1 is a schematic diagram of a desalination system in accordance with one embodiment of the invention.

FIG. 1 is a schematic diagram of a desalination system 10 in accordance with one embodiment of the invention. As illustrated in FIG. 1, the desalination system 10 comprises a desalination apparatus 11 configured to receive a first feed stream 12 having salts or other impurities from a first liquid source (not shown) for desalination to produce a first output stream 13.

Further, the desalination apparatus 11 is configured to receive a second feed stream 14 and a third feed stream 15 from respective second and third liquid sources (not shown) so that the second and the third feed streams 14, 15 cooperate to carry charged species removed from the first feed stream 12 out of the desalination apparatus 11 and produce respective second and third output streams 16, 17.

In non-limiting examples, the salts in the first feed stream 12 may include charged ions, such as magnesium ($Mg^{2+}$), calcium ($Ca^{2+}$), silica, sodium ($Na^+$), chlorine ($Cl^-$), and/or other ions. In one non-limiting example, the charged ions in the first feed stream 12 at least include a portion of target ions, such as ionized silica so that the desalination apparatus 11 may act as a silica removal apparatus to remove silica from the first feed stream 12.

Accordingly, the first output stream 13 has a lower concentration of the charged species, such as silica compared to the first feed stream 12. In some applications, the first output stream 13 may be circulated into the desalination apparatus 11 or other suitable desalination apparatuses, such as electrodialysis reversal (EDR) apparatuses for further desalination.

Generally, silica may be partially ionized in the first feed stream 12. Increasing pH of the first feed stream 12 causes ionization of silica therein and facilitates silica removal thereof. Accordingly, as depicted in FIG. 1, the desalination system 10 further comprises a pH adjustment unit 18 in fluid communication with the desalination apparatus 11 and is configured to increase the pH of the first feed stream 12 so as to facilitate ionization of silica in the first feed stream 12.

The pH adjustment unit 18 may adjust the pH of the first feed stream 12 to be greater than about 7, for example, to a range from about 8 to about 11. In particular, the pH of the first feed stream 12 may be adjusted to a range from about 9.5 to about 11.5. In one non-limiting example, the pH of the first feed stream 12 is adjusted to be about 11. After pH is adjusted, at least a portion of the silica in the first feed stream 12 may be ionized in the form of $HSiO_3^-$ and/or $SiO_3^{2-}$. For easy illustration, the ionized silica is shown as $HSiO_3^-$, for example.

For some arrangements, the pH adjustment unit 18 may comprise a pH adjustment source (not shown) to introduce additives into the first feed stream 12 to adjust the pH thereof. In non-limiting examples, the pH adjustment unit 18 may introduce basic additives into the first feed stream 12. Non-limiting examples of the basic additives include sodium hydroxide, potassium hydroxide and ammonia hydroxide. The basic additives may be introduced automatically or manually into the first feed stream 12. In certain applications, the pH adjustment unit 18 may not be employed in the desalination system 10 and the pH of the first feed stream 12 may be pre-adjusted.

Figure 2:
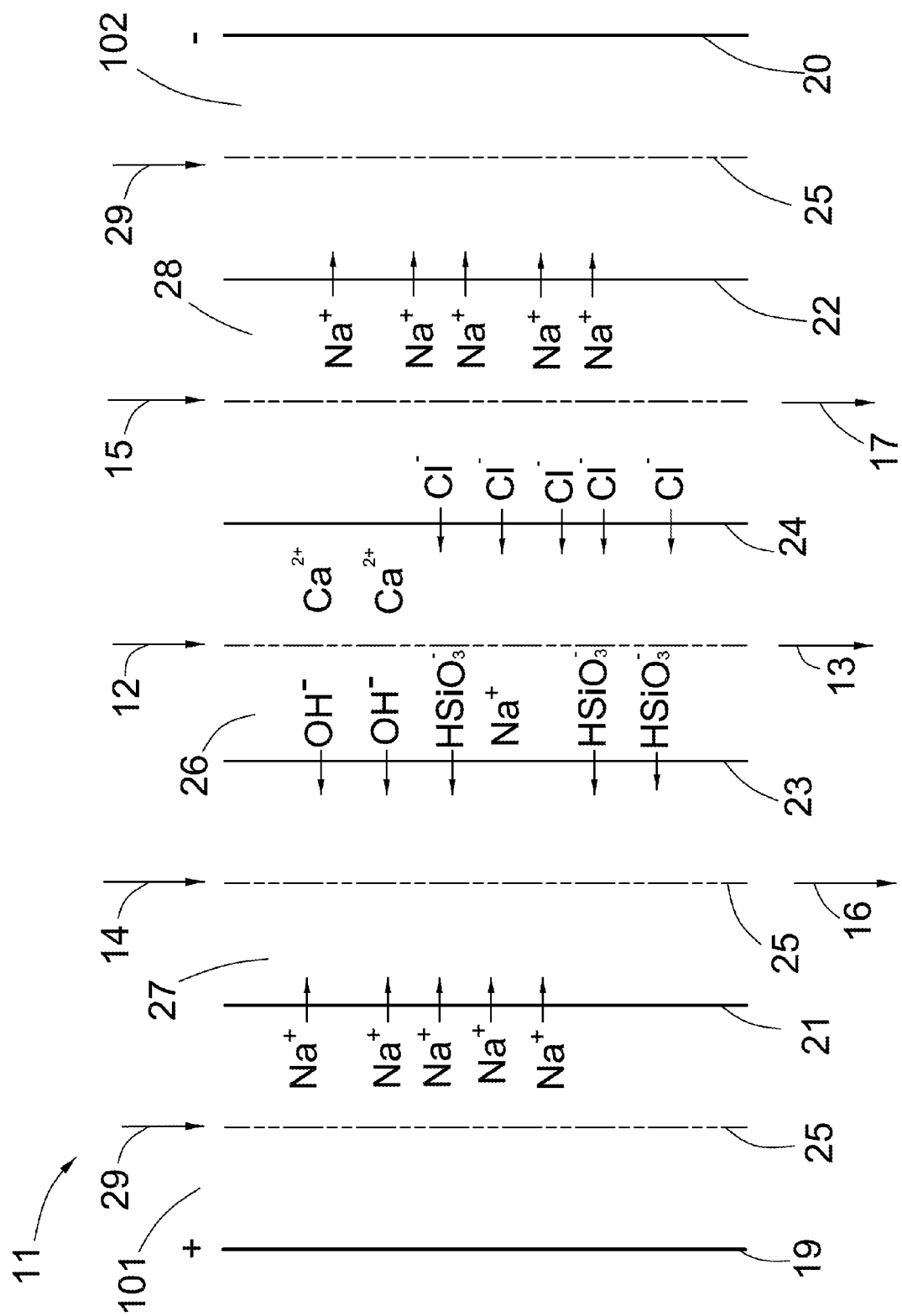
FIG. 2 is a schematic diagram of a desalination apparatus of the desalination system in accordance with one embodiment of the invention.

FIG. 2 illustrates a schematic diagram of the desalination apparatus 11 in accordance with one embodiment of the invention. In this example, the desalination apparatus 11 comprises a desalination unit. As illustrated in FIG. 2, the desalination unit 11 comprises a first electrode 19, a second electrode 20, a plurality of ion exchange membranes, and a plurality of spacers 25. In the illustrated example, the ion exchange membranes comprise a pair of cation exchange membranes 21, 22 and a pair of paired anion exchange membranes 23, 24.

The first and second electrodes 19, 20 are connected to positive and negative terminals of a power source (not shown) so as to act as an anode and a cathode, respectively. Alternatively, the polarity of the first and second electrodes 19, 20 may be reversed. In some examples, the first and second electrodes 19, 20 may include metal materials, such as titanium plate or platinum coated titanium plate. In other examples, the first and second electrodes 19, 20 may include electrically conductive materials, which may or may not be thermally conductive, and may have particles with smaller sizes and large surface areas. In some examples, the electrically conductive material may include one or more carbon materials.

Non-limiting examples of the carbon materials include activated carbon particles, porous carbon particles, carbon fibers, carbon aerogels, porous mesocarbon microbeads, or combinations thereof. In other examples, the electrically conductive materials may include a conductive composite, such as oxides of manganese, or iron, or both, or carbides of titanium, zirconium, vanadium, tungsten, or combinations thereof In the illustrated example, the first and second electrodes 19, 20 are in the form of plates that are disposed parallel to each other to form a stacked structure. In other examples, the first and second electrodes 19, 20 may have varied shapes, such as a sheet, a block, or a cylinder. In addition, the first and second electrodes 19, 20 may be arranged in varying configurations. For example, the first and second electrodes 19, 20 may be disposed concentrically with a spiraling and continuous space therebetween.

The cation exchange membranes 21, 22 and the anion exchange membranes 23, 24 are disposed between the first and second electrodes 19, 20 to be passable for cations and anions, respectively. In the illustrated example, the anion exchange membranes 23, 24 are disposed between the cation exchange membranes 21, 22. The cation exchange membrane 21 is thus located between the anion exchange membrane 23 and the first electrode 19, and the cation exchange membrane 22 is located between the anion exchange membrane 24 and the second electrode 20. A first channel 26 is defined between the pair of the anion exchange membranes 23, 24 for introduction of the first feed stream 12, and second and third channels 27, 28 are defined between the cation exchange membranes 21, 22 and the respective adjacent anion exchange membranes 23, 24 to receive the second and third feed streams 14, 15.

For some arrangements, under operating conditions, the first channel 26 may be referred to as a dilute channel and the second channel 27 may be referred to as a concentrate channel into which the removed silica is introduced. Alternatively, the third channel 28 may be referred to as the concentrate channel for receiving the removed silica from the first feed stream 12.

For the illustrated arrangement in FIG. 2, each of the cation exchange membranes 21, 22 comprises a normal cation exchange membrane. Each of the anion exchange membranes 23, 24 comprises a normal anion exchange membrane. The normal cation exchange membrane is configured to be passable for not only the monovalent cations but also polyvalent cations. The normal anion exchange membrane is configured to be passable for not only the monovalent anions but also polyvalent anions. In certain applications, the anion exchange membranes 23, 24 may comprise monovalent anion exchange membranes configured to be only passable for monovalent anions. The cation exchange membranes 21, 22 may comprise monovalent cation exchange membranes configured to be only passable for monovalent cations.

The spacers 25 are disposed between two adjacent ion exchange membranes 21-24, and between the first and second electrodes 19, 20 and the respective adjacent ion exchange membranes 21, 22. In some embodiments, the spacers 25 may comprise any ion-permeable, electronically nonconductive material, including membranes, and porous and nonporous materials.

Thus, during operation, while an electrical current is applied to the desalination apparatus 11, liquids, such as the first, second and third feed streams 12, 14, 15 are introduced into the first, second and third channels 26, 27, 28, respectively. In certain applications, the first, second and third feed streams 12, 14, 15 may or may not be introduced into desalination apparatus 11 simultaneously.

Because the first channel 26 is defined by the anion exchange membranes 23, 24, in the first channel 26, at least a portion of ionized silica, such as $HSiO_3^-$ and other anions, such as $OH^-$ in the first feed stream 12 pass through the anion exchange membrane 23 towards the anode 19 to enter into the second channel 27. Cations, such as $Ca^{2+}$ and $Na^+$ in the first feed stream 12 cannot pass through the anion exchange membrane 24 and remain in the first channel 26.

In the second channel 27 defined by the anion exchange membrane 23 and the cation exchange membrane 21, cations in the second feed stream 14 may not pass through the anion exchange membrane 23 towards the cathode 20 and remain in the second channel 27 even though the electrical field exerts a force on the cations toward the respective electrode (e.g. cations are pulled toward the cathode). Anions in the second feed stream 14 and other anions, such as $HSiO_3^-$ and $OH^-$ from the first channel 26 may not pass through the cation exchange membrane 21 towards the anode 19 and also remain in the second channel 27.

Additionally, in order to protect the electrodes 19, 20 and maintain electric conductivity between the two electrodes 19, 20, a fourth feed stream 29 may be introduced into fourth channels 101, 102 defined between the electrodes 19, 20 and the respective cation exchange membranes 21, 22. In one non-limiting example, the fourth feed stream 29 comprises NaSO4 solution so that cations, such as Na+ therein enter into and remain in the second channel 27.

For the illustrated arrangement, for facilitation of the introduction of $HSiO_3^-$ into the second channel 27, during desalination of the first feed steam 12, the third feed stream 15 is introduced into the third channel 28 to provide anions into the first channel 26 from the third channel 28 to achieve a balance of electric charge during the removal of $HSiO_3^-$ from the first channel 26. As a result, the second and third feed streams 14, 15 cooperate to remove silica from the first feed stream 12. Meanwhile, cations in the third feed stream 15 pass though the cation exchange membrane 22 towards the cathode 20.

In non-limiting examples, the third feed stream 15 may comprise soluble salts including active ionized anions, such as chloride ions. For example, the third feed stream 15 includes sodium chloride (NaCl) solution. In some examples, the second feed stream 14 may also comprise the sodium chloride (NaCl) solution. The concentration of the sodium chloride in the second feed stream 14 may be the same as or different from the concentration of that in the third feed stream 15. Alternatively, the second feed stream 14 may comprise different materials from the third feed stream 15. For example, the second feed steam 14 comprises pure water. In one non-limiting example, the third output stream 17 may also act as the second feed stream 14 to be redirected into the second channel 27.

Accordingly, as depicted in FIG. 2, during operation, the second feed stream 14 passes through the second channel 27 to carry the target anions, such as $HSiO_3^-$ from the first channel 26 out of the desalination apparatus 11 so that the silica in the first feed stream 12 is removed. As a result, the first output stream (a product stream) 13 and the second output stream 16 may have respective lower and higher concentration of the charged species, such as the target ions including the ionized silica, as compared to the first and second feed streams 12, 14. In the third channel 28, the ions in the third feed stream 15 are also removed to produce the third output stream 17 having a lower concentration of the charged species, such as $Cl^-$ and $Na^+$, as compared to the third feed stream 15.

Generally, increasing pH of the first feed stream 12 may cause the scaling or fouling tendency of the cations including, but not limited to $Ca^{2+}$ in the desalination apparatus. For the illustrated arrangement in FIG. 1, due to employment of the desalination apparatus 11, the ionized silica in the first feed stream 12 may be removed while the cations, such as $Ca^{2+}$ in the first feed stream 12 may still remain in the first channel 26 and may not concentrate in the second channel 27, so that the scaling or fouling tendency may be avoided or mitigated in the second channel 27.

In some examples, the polarity of the first and second electrodes 19, 20 of the desalination apparatus 11 may be reversed. During operation, in the first channel 26, at least a portion of ionized silica, such as $HSiO^{3-}$ and other anions, such as $OH^-$ in the first feed stream 12 pass through the anion exchange membrane 24 towards the anode 20 to enter into the third channel 28. Cations, such as $Ca^{2+}$ and $Na^+$ in the first feed stream 12 cannot pass through the anion exchange membrane 23 and remain in the first channel 26. The second feed stream 14 passes through the third channel 28 to carry the target anions, such as $HSiO_3^-$ removed from the first channel 26 out of the desalination apparatus 11 so that the silica in the first feed stream 12 is removed. Meanwhile, the third feed stream 15 passes through the second channel 27 and the anions, such as $Cl^-$ therein are introduced into the first channel 26 to achieve a balance of electric charge during the movement of $HSiO_3^-$ for facilitating the introduction of the ionized silica into the third channel 28 from the first channel 26. As a result, the second and third feed streams 14, 15 cooperate to remove silica from the first feed stream 12.

In some embodiments, the desalination apparatus 11 may comprises a plurality of desalination units. For example, a plurality of desalination units may be disposed separately and each desalination unit is constructed to be similar to the desalination unit in FIG. 2. Alternatively, the plurality of desalination units may be disposed to have common electrodes.

Figure 3:
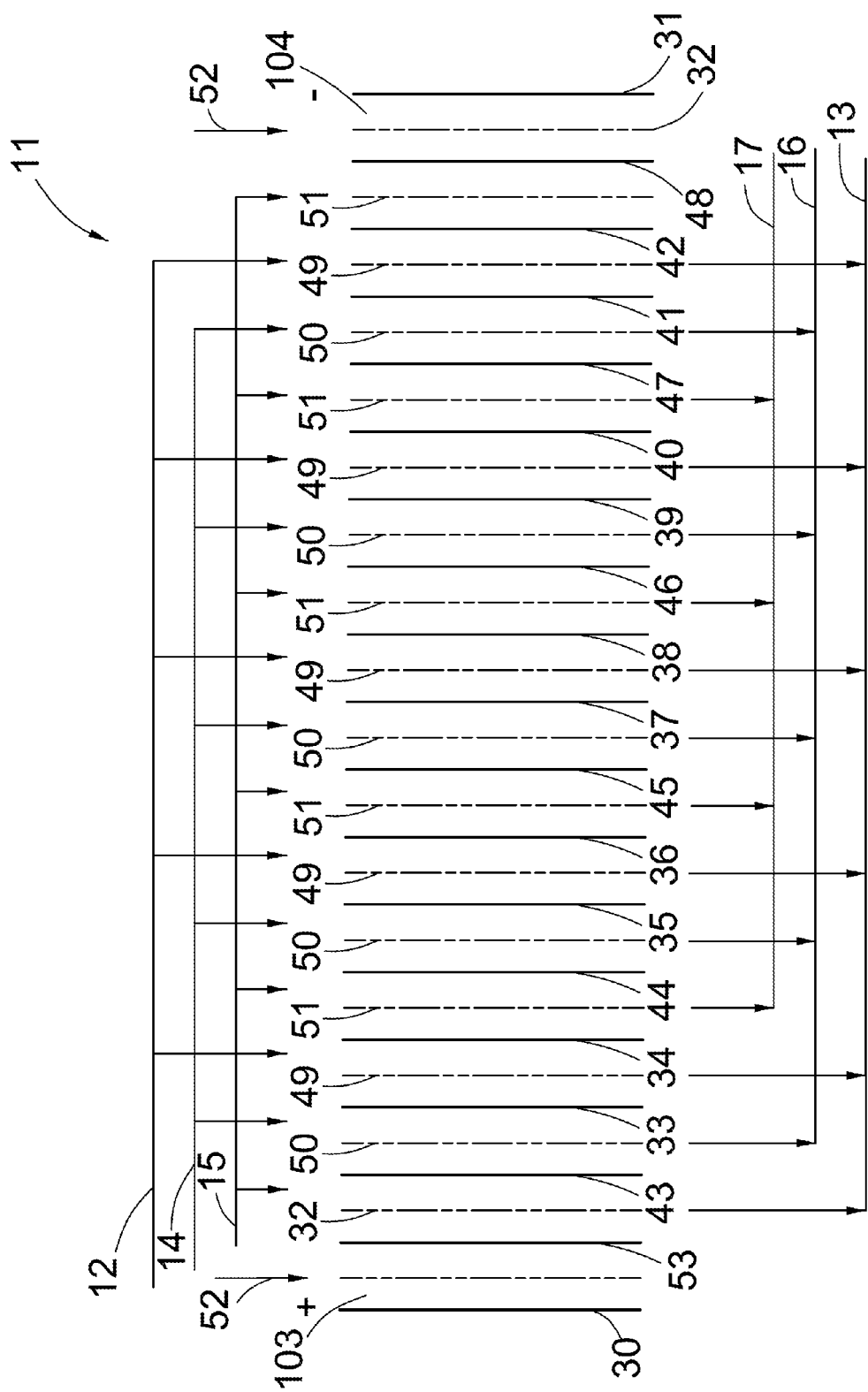
FIG. 3 is a schematic diagram of the desalination apparatus of the desalination system in accordance with another embodiment of the invention.

FIG. 3 illustrates a schematic diagram of the desalination apparatus 11 of the desalination system 10 in accordance with another embodiment of the invention. The same numerals in FIGS. 2-3 may indicate similar elements. As depicted in FIG. 3, the desalination apparatus 11 comprises a first electrode 30, a second electrode 31, a plurality of ion exchange membranes (not labeled), and a plurality of spacers 32.

In the illustrated example, the ion exchange membranes comprise five pairs of paired anion exchange membranes 33-42 and six cation exchange membranes 43-48. In other examples, the desalination apparatus 11 may comprise at least two pairs of the anion exchange membranes and at least three cation exchange membranes.

The first and second electrodes 30, 31 are connected to positive and negative terminals of a power source (not shown) so as to act as an anode and a cathode, respectively. The first and second electrodes 30, 31 comprise similar materials and/or have similar shapes as the respective electrodes 19, 20 in the arrangement in FIG. 2.

The anion exchange membranes 33-42 and the cation exchange membranes 43-48 are disposed between the first and second electrodes 30, 31 and comprise similar materials as the respective anion and cation exchange membranes 21-24. In the illustrated example, each pair of the anion exchange membranes 33-42 are disposed between every two adjacent cation exchange membranes 43-48 so as to define first channels 49 between each pair of the anion exchange membranes 33-42 for introduction of the first feed stream 12 and to define second and third channels 50, 51 between the anion exchange membranes of each pair of the anion exchange membranes and the respective adjacent cation exchange membranes to receive the second and third feed streams 14, 15.

Similar to the first, second and third channels 26-28 in FIG. 2, under operating conditions, the first channels 49 may be referred to as dilute channels and the second channels 50 may be referred to as a concentrate channel into which the removed silica enters. Alternatively, the third channels 51 may be referred to as the concentrate channel for introduction of the removed silica from the first feed stream 12.

For the illustrated arrangement, in order to protect the electrodes 30, 31 and maintain electric conductivity between the two electrodes, a fourth feed stream 52 similar to the fourth feed stream 29 in FIG. 2 is introduced into fourth channels 103, 104 defined between the electrodes 30, 31 and the respective cation exchange membranes 43, 48. In one non-limiting example, the fourth feed stream 52 comprises $NaSO_4$ solution.

In certain applications, the fourth feed steam 52 may comprise impurities, such as polyvalent cations including $Ca^{2+}$ and/or $Mg^{2+}$. Thus, in order to avoid the impurities in the fourth feed stream 52 enter into the second channel 50 defined between the anion exchange membrane 33 and the cation exchange membrane 43 to cause scaling or fouling therein, as illustrated in FIG. 3, an additional anion exchange membrane 53 is disposed between the electrode 30 and the cation exchange membrane 43. Alternatively, the additional anion exchange membrane 53 may not be employed. In some examples, the additional anion exchange membrane 53 may comprise similar materials as other anion exchange membranes 33-42.

The spacers 32 are disposed between two adjacent ion exchange membranes, and between the first and second electrodes 30, 31 and the respective adjacent membranes 48, 53. Similar to the spacers 25 in FIG. 2, the spacers 32 may comprise any ion-permeable, electronically nonconductive material, including membranes, and porous and nonporous materials.

Accordingly, similar to the arrangement in FIG. 2, during operation, while an electrical current is applied to the desalination apparatus 11, liquids, such as the first, second, and third feed streams 12, 14, 15 are introduced into the respective first, second and third channels 49, 50, 51, respectively. As a result, the silica in the first feed steam 12 is removed and carried out of the desalination apparatus 11 by the second feed stream 14. A first output stream (a product stream) 13 and a second output stream 16 may have respective lower and higher concentration of the charged species, such as the target ions including the ionized silica, as compared to the respective first and second feed streams 12, 14. A third output stream 17 also has a lower concentration of the charged species, such as Cl⁻ and Na⁺, as compared to the third feed stream 15. In non-limiting examples, during operation, the third output stream 17 from the third channels 51 may act as the second feed stream 14 for introduction into the second channels 50.

In certain applications, in order to avoid and/or alleviate the scaling tendency of the cations, such as $Ca^{2+}$ and $Mg^{2+}$ in the desalination apparatus 11, which may be caused by employment of the pH adjustment unit 18, a pretreatment unit may be employed to pretreat a liquid to at least partially remove polyvalent cations therein so as to produce the first feed stream 12 having a certain total dissolved solids (TDS) level and a certain concentration level of cations, such as $Ca^{2+}$ and $Mg^{2+}$ before the first feed stream 12 is introduced into the silica removal apparatus.

Figure 4:
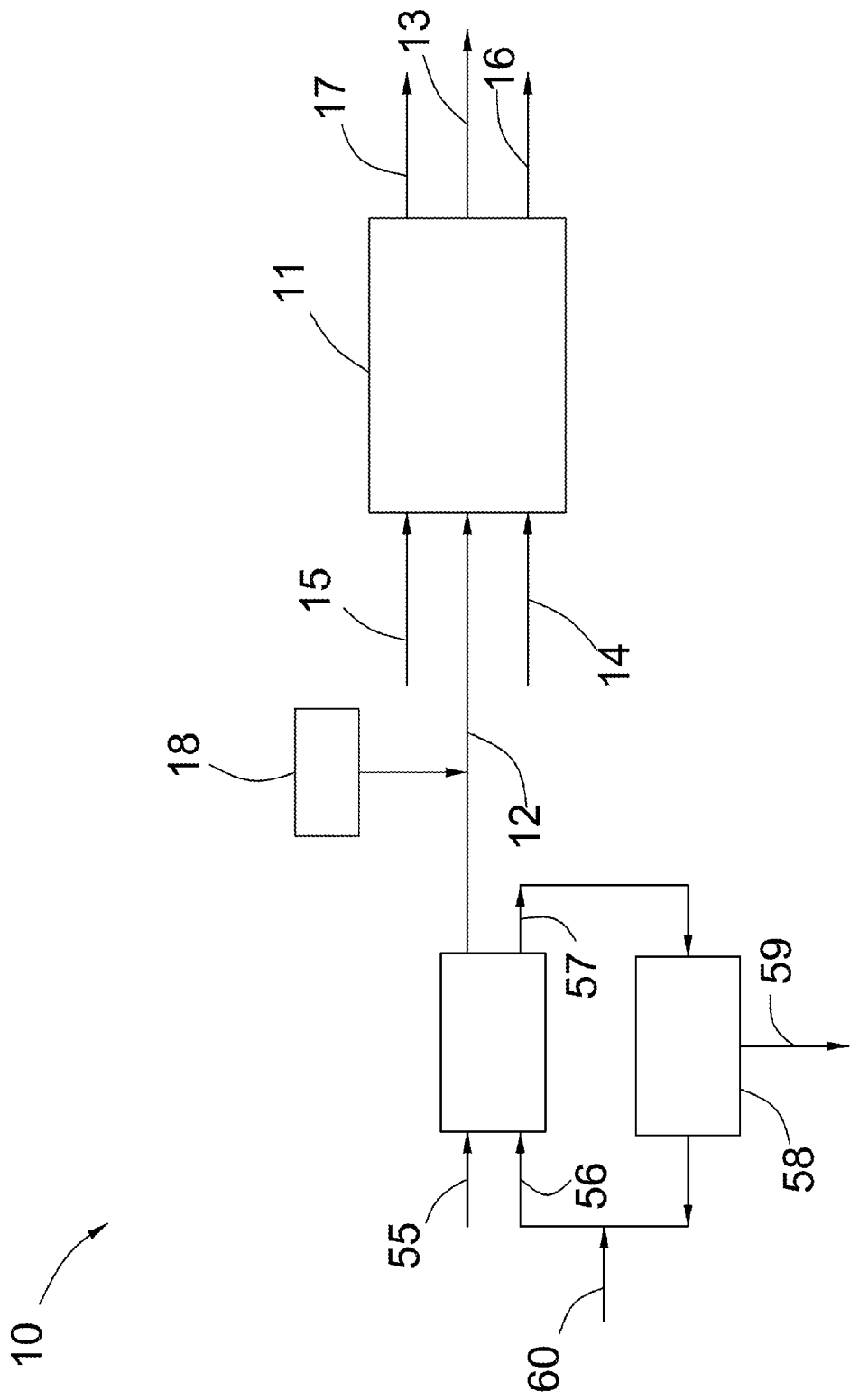
FIG. 4 is a schematic diagram of the desalination system in accordance with another embodiment of the invention.

FIG. 4 illustrates a schematic diagram of the desalination system 10 in accordance with another embodiment of the invention. As illustrated in FIG. 4, the arrangement is similar to the arrangement in FIG. 1. The two arrangements in FIGS. 1 and 4 differ in that in FIG. 4, a pretreatment unit 54 is disposed upstream of and in fluid communication with the desalination apparatus 11 to pretreat an input liquid 55 to remove at least a portion of the strongly ionized ions, such as calcium and magnesium ions therein so as to produce a first feed stream 12 with suitable TDS levels and suitable concentration levels of the cations.

For the illustrated arrangement, the pretreatment unit 54 comprises an electrodialysis reversal (EDR) apparatus. Alternatively, the pretreatment unit 54 may also comprise an electrodialysis (ED) apparatus, a supercapacitor desalination (SCD) apparatus or a softening apparatus to pretreat the input liquid 55.

Accordingly, during operation, the input liquid 55 is introduced into the EDR apparatus 54 for processing so that at least a portion of the anions and/or cations, such as $Ca^{2+}$ and $Mg^{2+}$ may be removed from the input liquid 55 so as to produce the first feed stream 12 having suitable TDS levels and suitable concentration levels of the cations for introduction into the desalination apparatus 11. Meanwhile, a second input liquid 56 is also introduced into the EDR apparatus 54 to carry the removed ions from the input liquid 55 out of the EDR apparatus 54 to produce an outflow stream 57, which may have a higher concentration of charged species compared to a second input liquid 56.

In certain applications, the desalination system 10 may further comprise a precipitation unit 58 in fluid communication with the EDR apparatus 54. The precipitation unit 58 may provide the second input liquid 56 circulated into the EDR apparatus 54. As the circulation of the second input liquid 56 continues, the concentration of the salts or other impurities continually increases, some salts with lower solubility, such as calcium sulphate in the second input liquid 56 is saturated or supersaturated. As a result, the degree of saturation or the supersaturation may reach a point where precipitation begins to take place in the precipitation unit 58. In some examples, at least a portion of the second input liquid 56 may be discharged from the precipitation unit 58 from a passageway 59. A fluid 60 may be introduced to supplement the second input liquid 56. In non-limiting examples, the fluid 60 may has a similar water source to the liquid 55.

Figure 5:
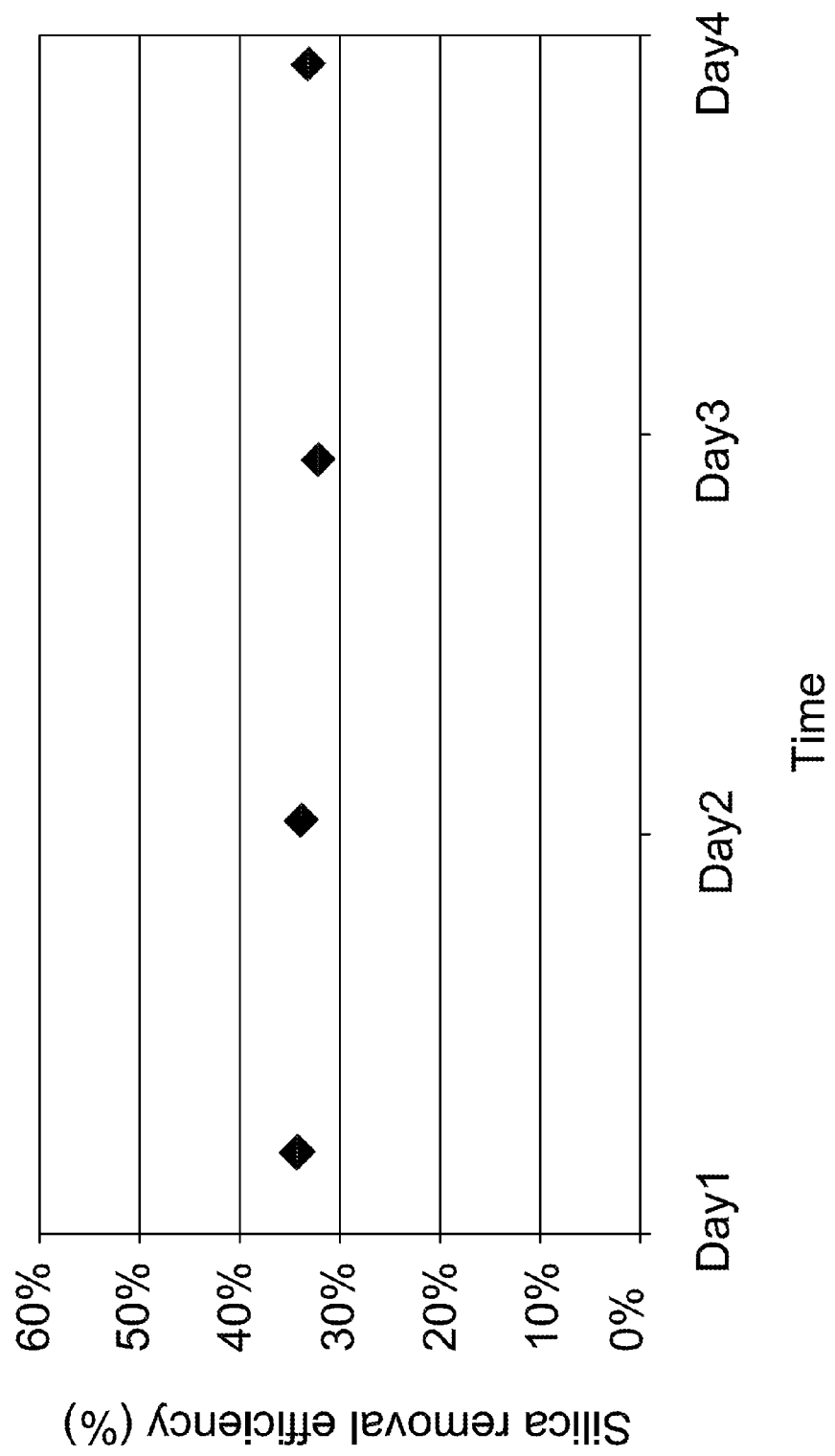
FIG. 5 is an experimental graph illustrating silica removal efficiency of the silica removal apparatus shown in FIG. 3 in accordance with one embodiment of the invention.

FIG. 5 illustrates an experimental graph illustrating silica removal efficiency of an experimental desalination apparatus 11 in accordance with one embodiment of the invention. In this exemplary experiment, the arrangement in FIG. 3 is employed. The first feed stream 12 includes about 60 ppm of silica and its flow rate is about 100 ml/min per cell pair. The pH of the first feed stream 12 is adjusted to be 11 before being introduced into the desalination apparatus 11. The third feed stream includes NaCl solution. The concentration of NaCl in the solution is about 40000 ppm. The third output stream 17 is feed into the second channels 50 to act as the second feed stream 14 and the flow rate of the second feed stream 14 is about 2 ml/min per cell pair. The electrical current applied on the desalination apparatus 11 is about 2.5 $mA/cm^2$.

As illustrated in FIG. 5, during continuous processing for about 3 days, the silica removal efficiency of the desalination apparatus 11 is above 30% and is relatively stable, which indicates the silica in the first feed stream 12 may be removed efficiently and the scaling in the second feed stream 13 may be mitigated accordingly.

It should be noted that the arrangements in FIGS. 1-4 are merely illustrative. For some arrangements, the arrangements in FIGS. 1-4 are employed for silica removal from an aqueous stream or a liquid. In other examples, the arrangements in FIGS. 1-4 may be used to remove any other suitable ions, for example divalent anions in a liquid.

In embodiments of the invention, each pair of at least one pair of the anion exchange membranes is disposed between the respective two adjacent cation exchange membranes to form at least one first channel between the at least one pair of the anion exchange membranes and to form at least one second channel and at least one third channel between the anion exchange membranes of the at least one pair of the anion exchange membranes and the respective adjacent cation exchange membranes. The first, second and third feed stream are introduced into the respective first, second, and third channels to cooperatively remove target ions, such as silica in the first feed stream 12. As a result, the target ions, such as silica in the first feed stream 12 may be removed efficiently and stably.

In some applications, the third output stream may act as the second feed stream to reuse the third output stream to improve water recovery. An additional anion exchange membrane may be optionally disposed between the anode and the cation exchange membrane adjacent to the anode so as mitigate or avoid scaling or fouling tendency in the channel defined between the cation exchange membrane and the respective pair of the anion exchange membrane. Additionally, the pretreatment unit may be employed so as to further avoid the scaling or fouling tendency during desalination of the first feed stream 12.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A desalination system, comprising:
    a silica removal unit configured to receive a first feed stream for silica removal and comprising:
        first and second electrodes;
        a plurality of ion exchange membranes disposed between the first and second electrodes and comprising a pair of cation exchange membranes and a pair of anion exchange membranes disposed between the pair of cation exchange membranes, a first channel being defined between the anion exchange membranes and second and third channels being defined between each anion exchange membrane and an adjacent cation exchange membrane, wherein the second channel is configured to receive output of the third channel; and
        a plurality of spacers disposed between adjacent ion exchange membranes and between the first and second electrodes and the respective ion exchange membranes.

2. The desalination system of claim 1, wherein the second channel is defined between the anion exchange membrane and the cation exchange membrane adjacent to the first electrode, and wherein the third channel is defined between the anion exchange membrane and the cation exchange membrane adjacent to the second electrode.

3. The desalination system of claim 1, wherein the first channel is configured to receive the first feed stream for silica removal, and wherein the second and third channels are configured to receive respective second and third feed streams cooperating to remove silica from the first feed stream.

4. The desalination system of claim 3, wherein the second channel is configured to receive the silica removed from the first channel.

5. The desalination system of claim 1, further comprising a pH adjustment unit in fluid communication with the silica removal unit and configured to adjust pH of the first feed stream.

6. The desalination system of claim 1, further comprising a pretreatment unit in fluid communication with the silica removal unit and configured to at least partially remove polyvalent cations in a liquid to produce the first feed stream prior to introduction of the first feed stream into the silica removal unit.

7. A desalination system, comprising:
    a silica removal apparatus configured to receive a first feed stream for silica removal and comprising:
        first and second electrodes;
        a plurality of ion exchange membranes disposed between the first and second electrodes and comprising at least three cation exchange membranes and at least two pairs of anion exchange membranes, each pair disposed between two cation exchange membranes so as to define a first channel between each pair of anion exchange membranes and second and third channels between each anion exchange membranes of each pair and an adjacent cation exchange membrane, wherein each second channel is configured to receive output of corresponding third channel; and
        a plurality of spacers disposed between adjacent ion exchange membranes and between the first and second electrodes and the respective ion exchange membranes.

8. The desalination system of claim 7, wherein the second channel is defined between each anion exchange membrane and the respective cation exchange membrane adjacent to the first channel and towards the first electrode, and wherein the third channel is defined between each anion exchange membrane and the respective cation exchange membrane adjacent to the first channel and towards the second electrode.

9. The desalination system of claim 7, wherein the first channel is configured to receive the first feed stream for silica removal, wherein the second and third channels are configured to receive respective second and third feed streams cooperating to remove silica from the first feed stream, and wherein the second channel is configured to receive the silica removed from the corresponding first channel.

10. The desalination system of claim 7, wherein the plurality of ion exchange membranes further comprises an additional anion exchange membrane disposed between the first electrode and the cation exchange membrane adjacent to the first electrode.

11. The desalination system of claim 7, further comprising a pH adjustment unit in fluid communication with the silica removal apparatus and configured to adjust pH of the first feed stream.

12. A desalination method for removing silica from an aqueous stream, comprising:
   passing a first feed stream through a first channel defined between at least one pair of anion exchange membranes disposed between first and second electrodes of a silica removal apparatus to produce a first output stream for silica removal;
   passing a second feed stream through a second channel defined between the anion exchange membrane of the at least one pair of anion exchange membranes and an adjacent cation exchange membrane disposed between the at least one pair of anion exchange membranes and the first electrode to carry away silica removed from the first feed stream and to produce a second output stream;
   passing a third feed stream through a third channel defined between the anion exchange membrane of the at least one pair of anion exchange membranes and an adjacent cation exchange membrane disposed between the at least one pair of anion exchange membranes and the second electrode to facilitate silica removal from the first channel to the adjacent second channel and to produce a third output stream; and
   redirecting the third output stream into the second channel to act as the second feed stream.

13. The desalination method of claim 12, wherein an additional anion exchange membrane is disposed between the first electrode and the cation exchange membrane adjacent to the first electrode.

14. The desalination method of claim 12, wherein the third feed stream comprises active anions, and wherein the third output stream comprises a lower concentration of the active anions than the concentration of the active anions in the third feed stream.

15. The desalination method of claim 12, wherein the second and third feed streams comprise different or the same materials.

16. The desalination method of claim 15, wherein the second feed steam comprises water, and wherein the third feed stream comprises sodium chloride solution.

17. The desalination method of claim 12, further comprising adjusting pH of the first feed stream prior to introduction of the first feed stream into the first channel.

18. The desalination method of claim 17, wherein the pH of the first feed stream is adjusted to a range from about 9.5 to about 11.5.

19. The desalination method of claim 12, further comprising at least partially removing polyvalent cations in a liquid to produce the first feed stream prior to introduction of the first feed stream into the first channel.

* * * * *